(No Model.)
F. MINK.
KNURLING OR ORNAMENTING WATCH CASES.
No. 482,686. Patented Sept. 13, 1892.
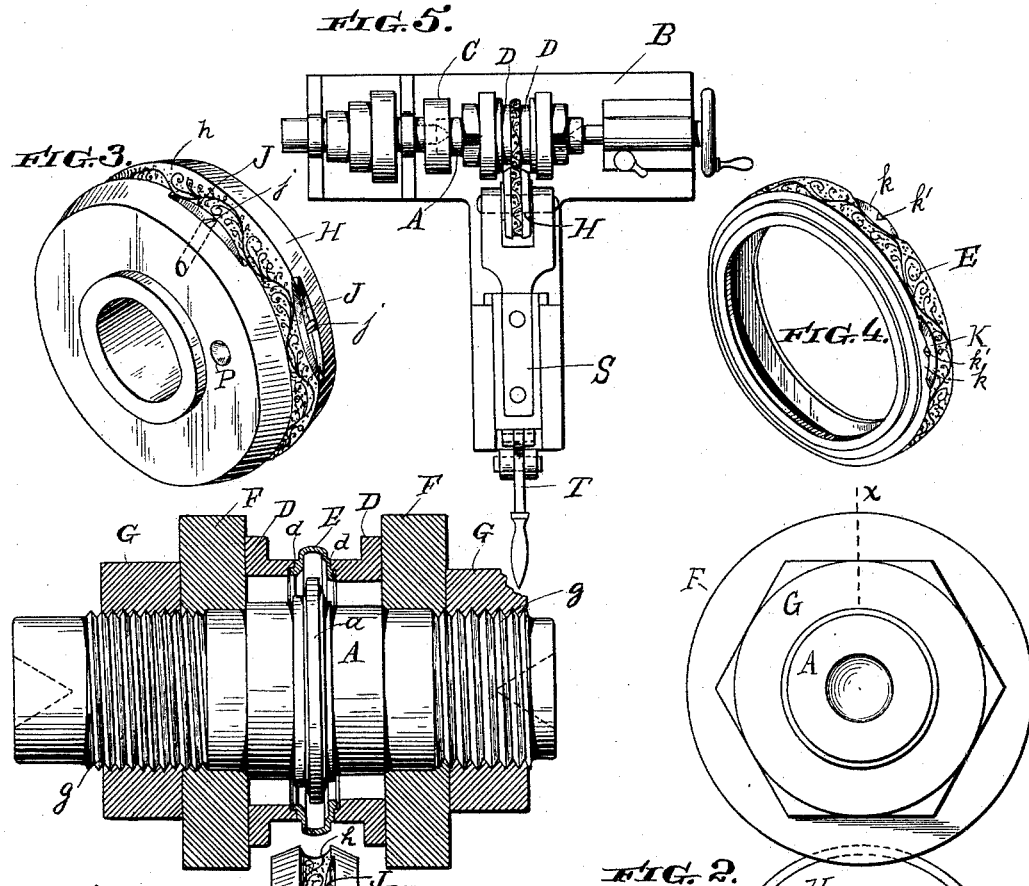
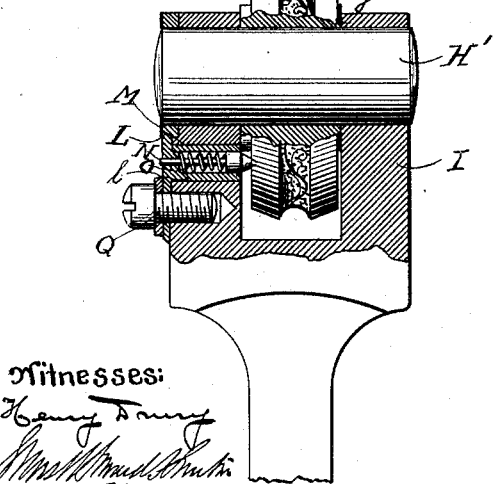
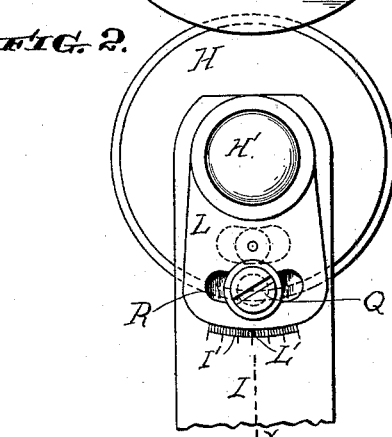
Witnesses:
Inventor:
Fritz Mink
by his attorney

UNITED STATES PATENT OFFICE.

FRITZ MINK, OF PHILADELPHIA, PENNSYLVANIA.

KNURLING OR ORNAMENTING WATCH-CASES.

SPECIFICATION forming part of Letters Patent No. 482,686, dated September 13, 1892.

Application filed October 11, 1890. Serial No. 367,846. (No model.)

*To all whom it may concern:*

Be it known that I, FRITZ MINK, of the city and county of Philadelphia, State of Pennsylvania, have invented an Improvement in Knurling or Ornamenting Watch-Cases, of which the following is a specification.

My invention relates to machines for knurling or ornamenting watch-cases; and it consists of certain improvements, which are fully set forth in the following specification and shown in the accompanying drawings, which form a part thereof.

It is usual in the manufacture of watch-cases to knurl or ornament the outer face of the center for the purpose of beautifying the watch-case. This is usually accomplished by hand-engraving, which is both slow and expensive and adds appreciably to the cost of manufacture.

It is the object of my invention to accomplish this knurling or ornamenting rapidly, effectively, and economically by means of machinery.

In carrying out my invention I employ a lathe with a mandrel, upon which the center is supported by means of clamps, with freedom of lateral play, and a knurling-tool provided with an annular die-face of the ornamentation which is to be imparted to the metal. This die-face is pressed in contact with the center and rotates with it, imparting the ornamentation to the metal of its surface. The knurling-tool is also constructed to form the hinge-flats of the center simultaneously with the ornamentation of the surface.

My invention also relates to certain novel constructions and combinations of parts, which are hereinafter more fully set out and claimed.

In the drawings, Figure 1 is a horizontal sectional view on the line $x\,x$ of Fig. 2 of my apparatus for knurling or ornamenting watch-cases removed from the lathe. Fig. 2 is a side elevation of the apparatus. Fig. 3 is a perspective view of the knurling die-wheel. Fig. 4 is a similar view of the knurled or ornamented center; and Fig. 5 is a plan view, on a reduced scale, of the apparatus with its lathe.

A is a mandrel supported between the centers of the lathe B and held thereto in any convenient manner, as by a lathe-chuck C. This mandrel A has its central portion $a$ formed to correspond with the inner surface of the center E, but of a smaller diameter, so that the center may be placed upon it.

D D are two rings of larger diameter than the mandrel A, having their adjacent faces formed with annular shoulders or ledges $d$, corresponding with the annular ledges upon the center and of the same diameter therewith. These rings D D are adapted to clamp the center between them, as shown in Fig. 1, the annular ledges $d$ fitting closely against the sides of the center and exposing only the outer annular surface of metal to be ornamented. These rings D D are clamped upon the center E by means of rings F F and threaded nuts G G, the mandrel A being provided with screw-threads $g$ for the nuts G. The center E is clamped between the rings D D in a direct line with the central portion $a$, and the clamping-rings D D are movable laterally between the rings F F to bring the interior of the center upon the central portion $a$.

H is a knurling-wheel loosely journaled upon the pin H' in the handle I and having a concave annular die-face $h$, provided with the ornamentation to be imparted to the metal of the center. The concavity of the annular die-face corresponds with the convexity of the surface to be ornamented.

J J are two projecting lips located upon the edge of the die-face $h$, one on each side, and separated a distance corresponding to the distance apart of the two hinge-flats K K upon the opposite sides of the center. These projecting lips form the hinge-flats K K upon the center by pressing or flattening the metal and forming the lips $k$ above the flattened portion. In the center of each projecting lip J is a pin or point $j$, which forms a notch $k$ in the center of each lip $k$, thus indicating accurately the central point of each hinge-flat K.

L is a plate pivoted to the journal H' and free to swing thereon, having a bushing $l$ extending into a slot M through one jaw of the handle I. Carried by the bushing $l$ is a pin N, pressed outwardly by a spring O. The side of the wheel H adjacent to the slot M in the handle is formed with a recess or depression P to receive the pin N, thereby forming a stop for the wheel after each complete revolution. The plate L is adjusted by means of the adjusting-screw Q, carried by the handle I, and the slot R in the plate L.

S is a slide for the handle I, which may be moved by means of a lever T or in any other convenient manner to bring the knurling-wheel H in contact with the annular face of the center. By adjusting the plate L the pin N is moved, thereby changing the position of the stop of the wheel H.

The operation of the apparatus is as follows: The center to be ornamented is placed upon the mandrel A and clamped between the clamping-rings D D by means of the rings F F and the adjusting-nuts G G. In practice it is convenient to have one of the rings F adjusted into position, so that it is necessary to have only one ring removed for placing the center upon the mandrel and to make the adjustment with one nut G only. The center is clamped between the rings D D directly in line with the central portion $a$ of the mandrel. The rings D D are free to play between the rings F F with the center E and bring its inner surface upon the part $a$. The knurling-wheel H is pressed in contact with the exposed surface of the center, forcing the center upon the part $a$ and rotating with it as it rotates upon the mandrel. The die-face presses into the exposed metal and imparts the ornamentation to it, at the same time forming the hinge-flats K K in the manner heretofore described. The annular faces of the rings D D are clamped firmly upon the rims of the center and prevent the displacement of the metal of the rims from the pressure of the die-face $h$ upon the surface of the metal.

The knurling or ornamentation of the center is accomplished in one complete revolution of the knurling-wheel and center, and it is apparent that there may be a slight unevenness at the juncture of the commencement and ending of the ornamentation. It is therefore desirable that the pendant of the watch-case should be attached at this point: For this reason the hinge-flats K K should be at an exact distance from the point of commencement and ending of the ornamentation, since they should be at a fixed distance from the pendant. The pin or stop N is therefore employed to accurately fix the point at which the knurling-wheel H commences the operation of ornamentation at the proper distance from the points at which the hinge-flat-forming lips J J are located, and by means of the adjusting-plate L this point may be ascertained and fixed. To regulate this adjustment with perfect accuracy, the handle I may be formed with a scale I' and the movable plate L with an indicating pin or finger L'.

While my apparatus is particularly suited to the ornamentation or knurling of the centers of watch-cases, it is not of necessity limited thereto, but may be used for the ornamentation of other articles.

While I prefer the minor details of construction which are here shown, I do not limit my invention to them, as it is apparent that they may be varied without departing from the invention.

What I claim as new, and desire to secure by Letters Patent, is—

1. In a machine for ornamenting watch-case centers, the combination of a mandrel, two clamping-rings having a larger internal diameter than the mandrel, so as to be free to move upon the mandrel-shaft transversely to its axis, for clamping the article to be ornamented between them, and a rotary die-wheel adapted to be brought in contact with the surface of the metal exposed between said clamping-rings.

2. In a machine for ornamenting watch-case centers, the combination of a mandrel, two clamping-rings having a larger internal diameter than the mandrel, so as to be free to move upon the mandrel-shaft transversely to its axis, and formed with annular clamping-ledges corresponding with the ledges upon the rims of the center for clamping the article to be ornamented between them, with an annular surface exposed between said rings, and a rotary die-wheel adapted to be brought in contact with the surface of the metal exposed between said clamping-rings.

3. In a machine for ornamenting watch-case centers, the combination of a mandrel, two clamping-rings having a larger diameter than the mandrel and movable transversely to the axis thereof for clamping the article to be ornamented between them, and a rotary die-wheel adapted to be brought in contact with the surface of the metal to be ornamented, exposed between said clamping-rings, said die-wheel being formed with one or more projecting lips on the edge of its annular die-surface for forming the hinge-flats of the center.

4. The combination, with a rotating supporting-mandrel for a watch-case center, of a wheel H, having an annular die-surface $h$, and lips J, projecting from the edge of said die-surface and formed with the pins or points $j$ in said projecting lip, substantially as and for the purpose specified.

5. The combination, with a supporting-mandrel for a watch-case center, of a wheel having an annular die-surface adapted to be pressed in contact with the annular edge of the center, a supporting-handle in which said wheel is journaled, and a stop between said handle and wheel for arresting the movement of the latter after a complete rotation.

6. The combination, with a supporting-mandrel for a watch-case center, of a knurling-wheel having an annular die-surface adapted to be brought in contact with the surface of the center and having a recess upon one of its sides, a supporting-handle in which said wheel is journaled, and an adjustable stop carried by said handle and adapted to engage with the recess of the knurling-wheel to arrest it after one complete revolution.

7. The combination, with a supporting-mandrel for a watch-case center, of a knurling-wheel having an annular die-surface adapted to be brought in contact with the annular surface of the center and having a recess upon one of its sides, a handle in which said wheel is journaled, provided with a slot M, a plate L, pivoted to said handle, having a slot R, a spring-pressed pin N, carried by the plate L, and an adjusting-screw Q, working in the slot R of the plate L, substantially as and for the purpose specified.

8. In a machine for ornamenting watch-case centers, &c., the combination of a rotating mandrel having a central portion formed to correspond with the interior of the center but of smaller diameter, clamps to clamp the center in line with said central portion of the mandrel, with freedom of movement transversely to the axis of the mandrel, and a knurling-wheel having an annular die-surface adapted to be brought in contact with the annular face of the center.

9. A knurling-wheel for ornamenting watch-case centers, having an annular die-surface and provided with one or more lips projecting upon said annular die-surface for forming the hinge-flats upon the center simultaneously with imparting the ornamentation thereto.

In testimony of which invention I have hereunto set my hand.

FRITZ MINK.

Witnesses:
 ERNEST HOWARD HUNTER,
 S. T. YERKES.